(12) United States Patent
Xiao et al.

(10) Patent No.: US 10,078,443 B2
(45) Date of Patent: Sep. 18, 2018

(54) CONTROL SYSTEM FOR VIRTUAL MOUSE AND CONTROL METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhi-Ming Xiao, Shenzhen (CN); Jian Liu, Shenzhen (CN); Ming-Jun Chen, Shenzhen (CN); Wei Qu, Shenzhen (CN); Wei-Min Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 456 days.

(21) Appl. No.: 14/820,018

(22) Filed: Aug. 6, 2015

(65) Prior Publication Data

US 2016/0349981 A1 Dec. 1, 2016

(30) Foreign Application Priority Data

May 25, 2015 (CN) .......................... 2015 1 0271791

(51) Int. Cl.
*G06F 3/0488* (2013.01)
*G06F 3/0484* (2013.01)
(52) U.S. Cl.
CPC ...... *G06F 3/04883* (2013.01); *G06F 3/04842* (2013.01)

(58) Field of Classification Search
CPC ............. G06F 3/04883; G06F 3/04886; G06F 3/04845; G06F 3/04817; G06F 3/04842; G06F 3/0482; G06F 3/04812
See application file for complete search history.

(56) References Cited

U.S. PATENT DOCUMENTS

| | | | | |
|---|---|---|---|---|
| 2009/0322687 | A1* | 12/2009 | Duncan | G06F 3/04883 345/173 |
| 2011/0093822 | A1* | 4/2011 | Sherwani | H04L 67/38 715/863 |
| 2014/0168095 | A1* | 6/2014 | Mesguich Havilio | G06F 3/04883 345/173 |

(Continued)

FOREIGN PATENT DOCUMENTS

| | | |
|---|---|---|
| CN | 104536641 A | 4/2015 |
| TW | 201514829 | 4/2015 |

*Primary Examiner* — Anil K Bhargava
(74) *Attorney, Agent, or Firm* — ScienBiziP, P.C.

(57) ABSTRACT

A control method for virtual mouse is provided. The control method is run on an electronic device. The control method includes a plurality of steps. Control a touch unit of the electronic device to display a user interface, a virtual mouse and a cursor on the user interface. Recognize a slide gesture dragging the virtual mouse. Compare the slide gesture with a plurality of predefined gestures stored in a storage unit of the electronic device. Obtain a control order corresponding to one of the plurality of predefined gestures when the slide gesture is the same as the one of the plurality of predefined gestures. Control the cursor to move a motion vector according to the control order. Recognize a click gesture clicking the virtual mouse. Control the electronic device to activate an application program or enter into a link of a text or a picture.

16 Claims, 9 Drawing Sheets

(56) References Cited

U.S. PATENT DOCUMENTS

| | | | |
|---|---|---|---|
| 2014/0344766 A1* | 11/2014 | Cao | G06F 3/017 |
| | | | 715/863 |
| 2015/0100912 A1* | 4/2015 | Chang | G06F 3/04886 |
| | | | 715/773 |
| 2015/0339036 A1* | 11/2015 | Hwang | G06F 9/4443 |
| | | | 715/763 |

* cited by examiner

CONTROL SYSTEM FOR VIRTUAL MOUSE AND CONTROL METHOD THEREOF

FIELD

The subject matter herein generally relates to control systems for virtual mouse and control methods thereof, especially to a control system for virtual mouse and a control method thereof which can help a user in using an electronic device having a larger screen.

BACKGROUND

Electronic devices, such as a mobile phone, a tablet computer, or the like, can have touch screens for users inputting. The touch screen can include one or more sensors configured to detect motion on or near the touch screen. For example, capacitive or resistive sensors can be implemented.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "including," when utilized, means "including, but not necessarily limited to"; it specifically indicates open-ended inclusion or membership in the so-described combination, group, series and the like.

The present disclosure relates to a control system for virtual mouse, which is running on an electronic device. The control system includes at least one processing unit; and a non-transitory computer readable medium coupled to the at least one processing unit and configured to store instructions for execution by the at least one processing unit. The instructions cause the at least one processing unit to control a touch unit of the electronic device to display a user interface, a virtual mouse and a cursor on the user interface, recognize a touch gesture in response to operation signals. Therein the operation signals are generated by the touch unit in response to touch operations performed thereon. The touch gesture includes a slide gesture dragging the virtual mouse and a click gesture clicking the virtual mouse. The instructions cause the at least one processing unit to compare the slide gesture with a plurality of predefined gestures stored in a storage unit of the electronic device, determine whether the slide gesture is same as one of the plurality of predefined gestures. The instructions cause the at least one processing unit to obtain a control order corresponding to the one of the plurality of predefined gestures when the slide gesture is the same as the one of the plurality of predefined gestures. The control order is an order for controlling the cursor to move a motion vector. The instructions cause the at least one processing unit to control the cursor to move the motion vector according to the control order and control the electronic device to activate an application program located below the cursor or enter into a link of a text or a picture located below the cursor according to the click gesture.

The present disclosure relates to a control method for virtual mouse, which is running on an electronic device. The control method includes as follows. Controlling a touch unit of the electronic device to display a user interface and further display a virtual mouse and a cursor on the user interface. Recognizing a slide gesture dragging the virtual mouse; comparing the slide gesture with a plurality of predefined gestures stored in a storage unit of the electronic device. Determining whether the slide gesture is same as one of the plurality of predefined gestures. Obtaining a control order corresponding to the one of the plurality of predefined gestures when the slide gesture is the same as the one of the plurality of predefined gestures, and the control order is an order for controlling the cursor to move a motion vector. Controlling the cursor to move the motion vector according to the control order; recognizing a click gesture clicking the virtual mouse. Controlling the electronic device to activate an application program located below the cursor or enter into a link of a text or a picture located below the cursor according to the click gesture.

The present disclosure relates to a non-transitory storage medium having stored thereon instructions. The instructions are executed by at least one processing unit of an electronic device. The instructions cause the least one processor to execute instructions of a control method for virtual device. The control method includes as follows. Controlling a touch unit of the electronic device to display a user interface and further display a virtual mouse and a cursor on the user interface. Recognizing a slide gesture dragging the virtual mouse; comparing the slide gesture with a plurality of predefined gestures stored in a storage unit of the electronic device. Determining whether the slide gesture is same as one of the plurality of predefined gestures. Obtaining a control order corresponding to the one of the plurality of predefined gestures when the slide gesture is the same as the one of the plurality of predefined gestures, and the control order is an order for controlling the cursor to move a motion vector. Controlling the cursor to move the motion vector according to the control order. Recognizing a click gesture clicking the virtual mouse. Controlling the electronic device to activate an application program located below the cursor or enter into a link of a text or a picture located below the cursor according to the click gesture.

Figure 1:
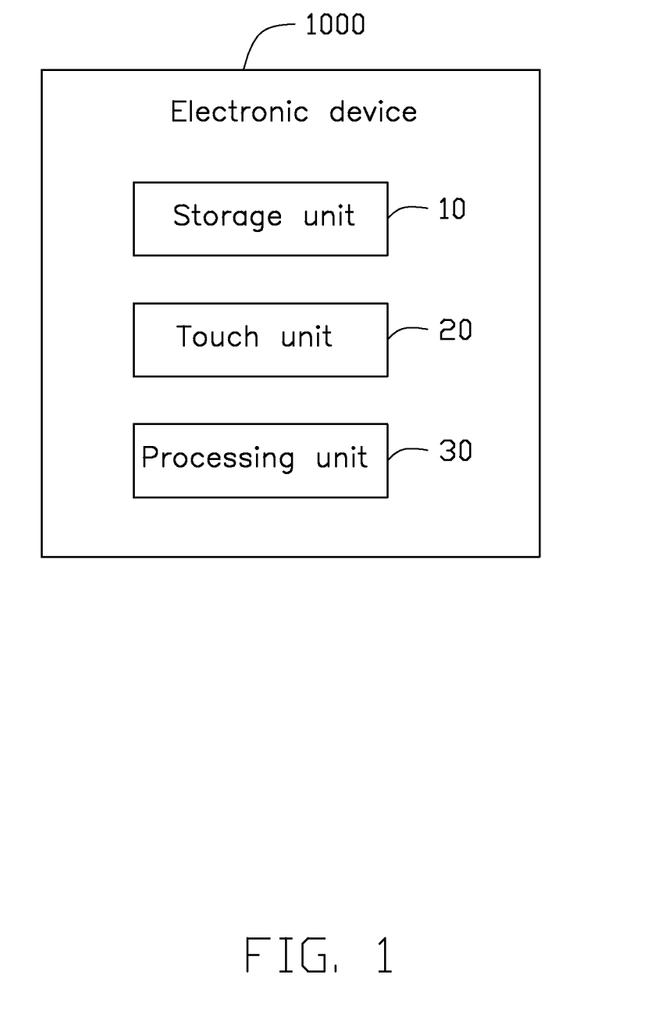
FIG. 1 is a block diagram of an embodiment of an operating environment of a control system for virtual mouse.
Figure 2:
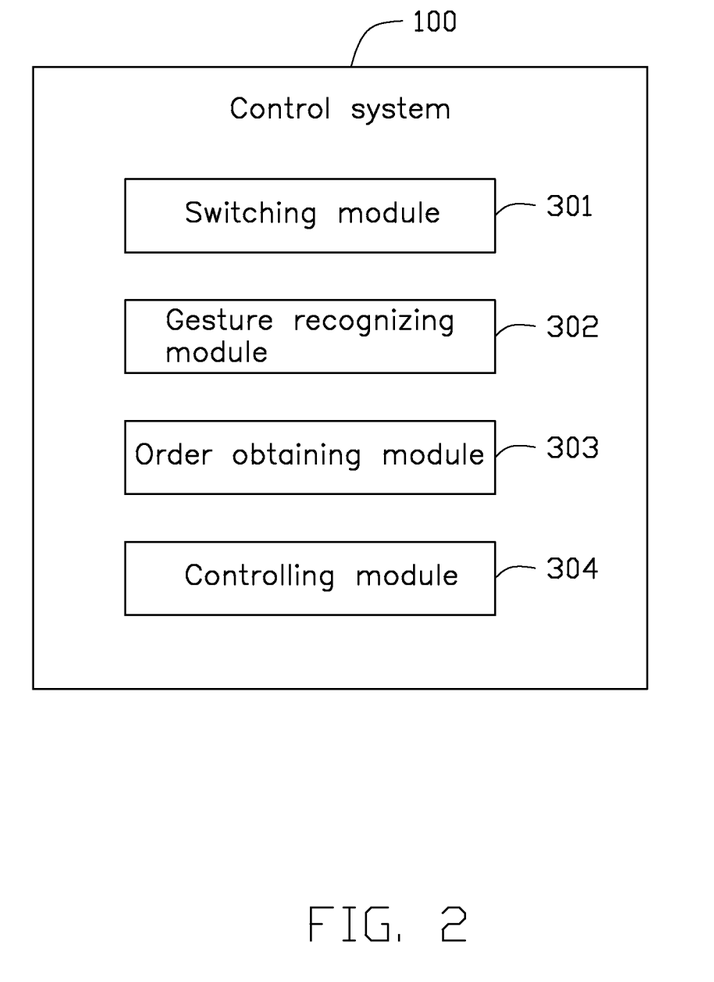
FIG. 2 is a block diagram of an embodiment of the control system for a virtual mouse.

FIG. 1 shows an embodiment of an operating environment of a control system for virtual mouse 100 as shown in FIG. 2. The operating environment can include but not limited to an electronic device 1000. The electronic device 1000 can be a terminal device having a touch screen, such as a personal computer, a mobile phone, or a tablet computer or other suitable device.

The electronic device 1000 can include a storage unit 10, a touch unit 20 and a processing unit 30. The storage unit 10 can store a relationship recording relationships between a plurality of predefined gestures and a plurality of control orders. The predefined gestures can be motion vectors in a relative coordinate system. The control orders can be motion vectors in the relative coordinate system. Each motion vector of the control order can correspond to one of the motion vectors of the plurality of predefined gestures. The storage unit 10 can further store an operating system (not shown) which can be run by the electronic device 1000.

In at least one embodiment, the storage unit 10 can be an internal storage system, such as a flash memory, a random access memory (RAM) for temporary storage of information, and/or a read-memory (ROM) for permanent storage of information.

In at least one embodiment, the storage unit 10 can also be a storage system, such as a hard disk, a storage card, or a data storage medium. The storage unit 10 can include volatile and/or non-volatile storage devices.

In at least one embodiment, the storage unit 10 can include two or more storage devices such that one storage device is a memory and the other storage device is a hard drive. Additionally, the storage unit 10 can be respectively located either entirely or partially external relative to the electronic device 1000.

The touch unit 20 can be used to generate corresponding operation signals in response to touch operations performed thereon. The touch unit 20 can be a touch screen, and/or any other component(s) or device(s) that can identify a touch operation and display contents. In this embodiment, the touch unit 20 can be a touch screen. The touch operations can include but not limited to slide gestures, click gestures, press gestures and/or other suitable gestures. The click gestures can include single-click gestures and double-click gestures. The click gestures can be differentiate from the slide gestures via different pressures performed on the touch unit 20.

Figure 3:
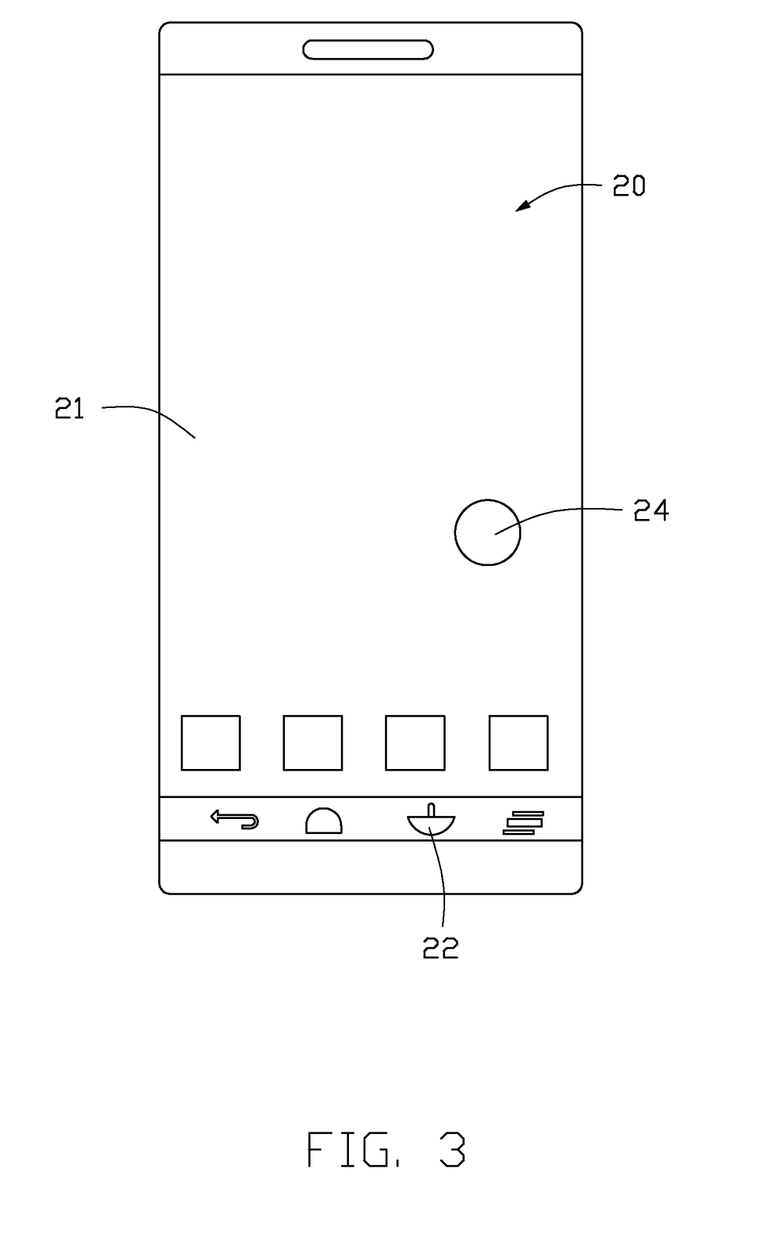
FIG. 3 is a partial diagram of an embodiment of a user interface of an electronic device as shown in FIG. 1.

The processing unit 30 can be used to run the operating system such that a user interface 21 (as shown in FIG. 3) is capable of displaying on the touch unit 20.

In at least one embodiment, the processing unit 30 can be a central processing unit, a digital signal processor, or a single chip.

As shown in FIG. 2, the control system 100 can include a plurality of modules. The plurality of modules can include a switching module 301, a gesture recognizing module 302, an order obtaining module 303 and a controlling module 304. The switching module 301, the gesture recognizing module 302, the order obtaining module 303 and the controlling module 304 can be stored in the storage unit 10 of the electronic device 1000, and further applied on the processing unit 30 of the electronic device 1000. The modules of the control system 100 can include separated functionalities represented by hardware or integrated circuits, or as software and hardware combinations, such as a special-purpose processor or a general-purpose processor with special-purpose firmware.

The control system 100 can be an application program installed on the electronic device 1000. When the electronic device 1000 is activated, the switching module 301 can be used to activate the application program in response to an open operation performed thereon or close the application program in response to a close operation performed thereon.

Figure 4:
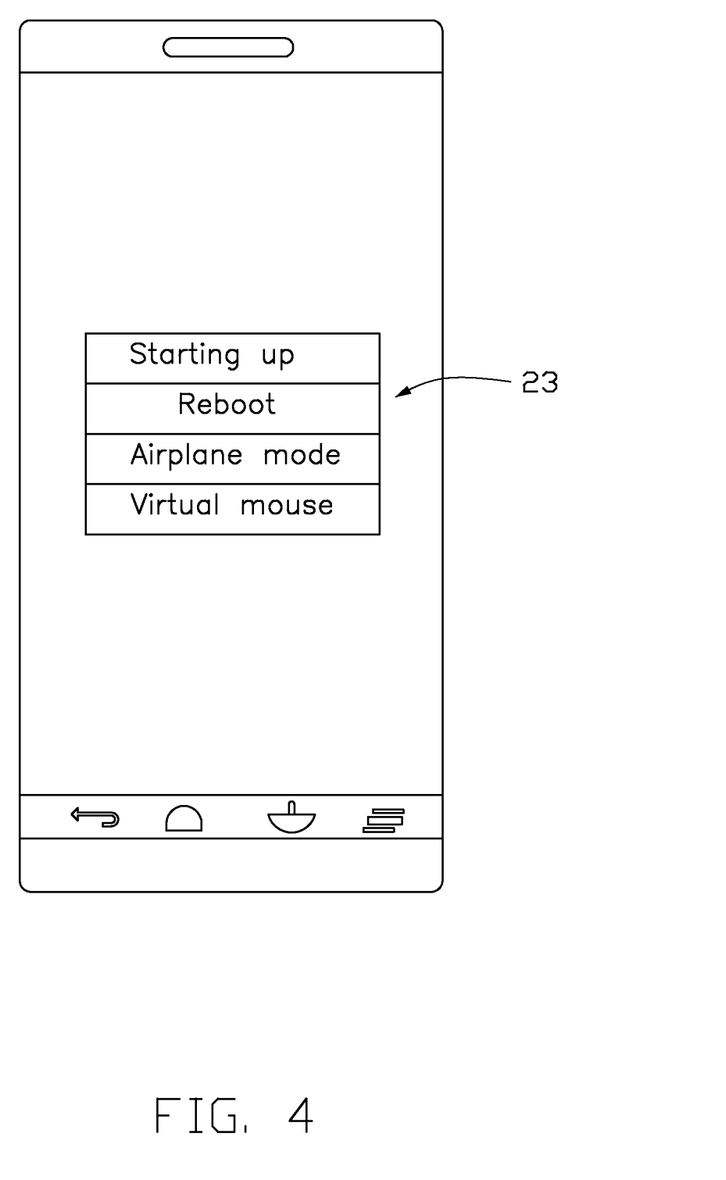
FIG. 4 is a partial diagram of an embodiment of a user interface of an electronic device as shown in FIG. 1.

Referring to FIGS. 3 and 4, the open operation can be selected from a group consisting of: double-click a space of the user interface 21, single-click an activate icon 22 located on a taskbar of the user interface 21, long press a power button (not shown) of the electronic device 1000 to display a selection bar 23 and further select one corresponding option including in the selection bar 23, that is, an option of virtual module, double-click a float 24 displayed on the user interface 21, or other suitable operations. The close operations can be but not limited to press a menu button (not shown) of the electronic device 1000.

Figure 5:
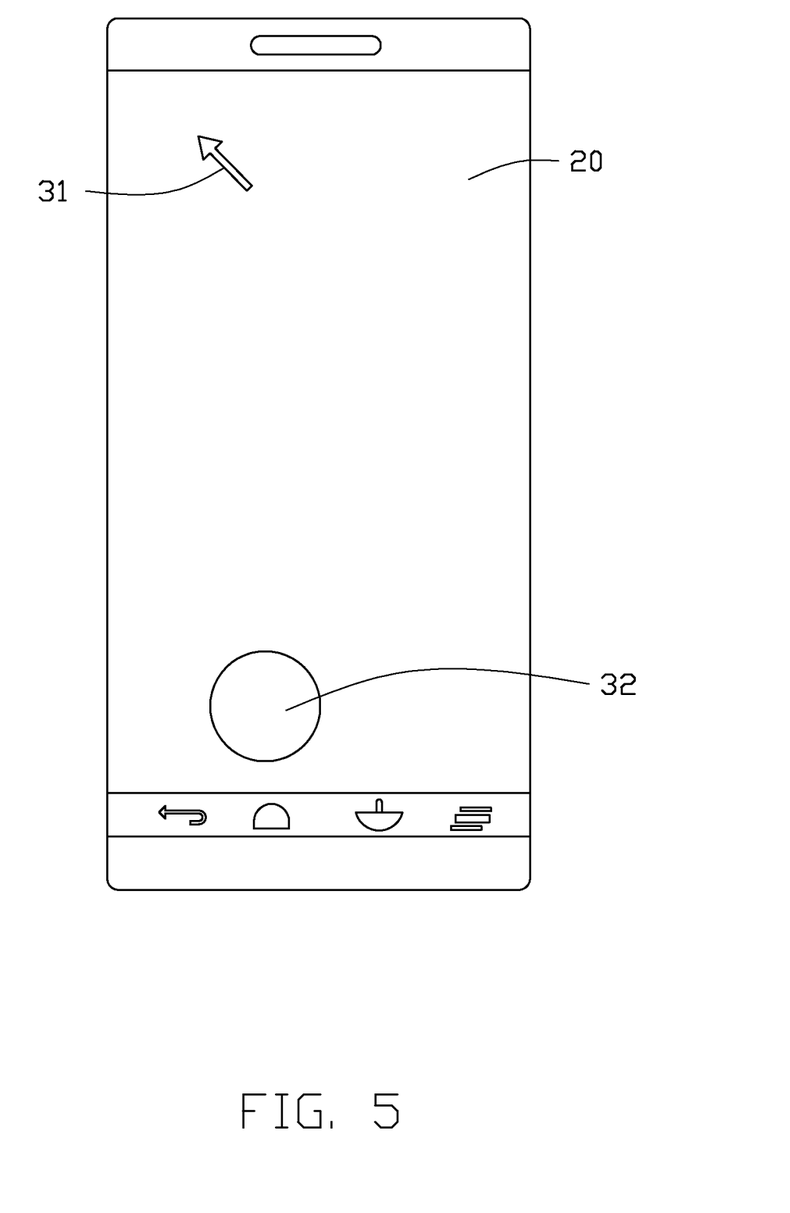
FIG. 5 is a partial diagram of an embodiment of a cursor and a virtual mouse displayed on user interface of an electronic device as shown in FIG. 1 when the control system as shown in FIG. 2 is activated.

As illustrated in FIG. 5, when the control system 100 is activated, the control system 100 can control the touch unit 20 to display a cursor 31 and a virtual mouse 32 on the user interface 21. The cursor 31 can be arrow-shaped, and the virtual mouse 32 can be circle-shaped. In at least one embodiment, the cursor 31 and the virtual mouse 32 can be other shapes according to need.

As illustrated in FIGS. 2 and 5 again, the gesture recognizing module 302 can be used to recognize a touch gesture in response to the operation signals. In this embodiment, the touch gesture can be a slide gesture dragging the virtual mouse 32 using a fingertip. The gesture recognizing module 302 can be further used to smooth the slide gesture, eliminate noise of the slide gesture and extract image features from the slide gesture, such that, a processed slide gesture can be obtained. In at least one embodiment, the slide gesture does not need to be smoothed, eliminated and extracted.

The order obtaining module 303 can be used to compare the slide gesture with the plurality of predefined gestures stored in the storage unit 10. The order obtaining module 303 can be used to determine whether the slide gesture is same as one of the plurality of predefined gestures preciously or in an error-allowed range. The order obtaining module 303 can be further used to obtain a control order corresponding to the one of the plurality of predefined gestures when the slide gesture is same as the one of the plurality of predefined gestures preciously or in the error-allowed range. The control order can be an order for controlling the cursor 31 to move a motion vector. In this embodiment, the slide gesture can be a motion vector corresponding to the virtual mouse 32 in the relative coordinate system, and the control order can be the motion vector corresponding to the cursor 31 in the relative coordinate system.

The controlling module 304 can be used to control the cursor 31 to move the motion vector in the relative coordinate system. In at least one embodiment, if the cursor 31 may move to a position out of a predefined range of the user interface 21, the controlling module 304 can be used to control the cursor 31 to stop on a boundary of the user interface 21. The controlling module 304 can be further used to control the boundary of the user interface 21 to highlight or otherwise signify that a user of the electronic device 1000 can be prompted that the cursor 31 has reached to the boundary of the user interface 21.

The touch gesture can be further a double-click gesture double-clicking the virtual mouse 32. When the gesture recognizing module 302 recognizes the double-click gesture in response to the operation signals, the controlling module 304 can be used to control the electronic device 1000 to activate an application program located below the cursor 31 or enter into a link of a text or a picture located below the cursor 31.

In at least one embodiment, the double-click gesture can be replaced by a single-click gesture single-clicking the virtual mouse 32. The controlling module 304 can be used to control the electronic device 1000 to activate the application program located below the cursor 31 or enter into the link of the text or the picture located below the cursor 31 according to the single-click gesture.

The touch gesture can be a press gesture long pressing the virtual mouse 32. When the gesture recognizing module 302 recognizes the press gesture, the controlling module 304 can be used to control the user interface 21 to enter into an edit state. When the user interface 21 is in the edit state and the gesture recognizing module 302 recognizes the slide gesture dragging the virtual mouse 32 using the fingertip, the controlling module 304 can be used to control the virtual mouse 32 to slide following with the slide gesture and further stop to slide if the slide gesture is stopped. When the user interface 21 is in the edit state and the gesture recognizing module 302 recognizes a single-click gesture single-clicking the user interface 21 except the virtual mouse 32, the controlling module 304 can be used to control the user interface 21 to exit the edit state. In at least one embodiment, the single-click gesture can be replaced by a double-click gesture double-clicking the user interface 21 except the virtual mouse 32.

In at least one embodiment, the press gesture can be a press gesture of which the pressing time is greater than a predefined time period, such as 2 seconds, 3 seconds or the like.

In at least one embodiment, the controlling module 304 can be used to control the user interface 21 to exit the edit state in response to a touch operation performed on the menu button.

Figure 6:
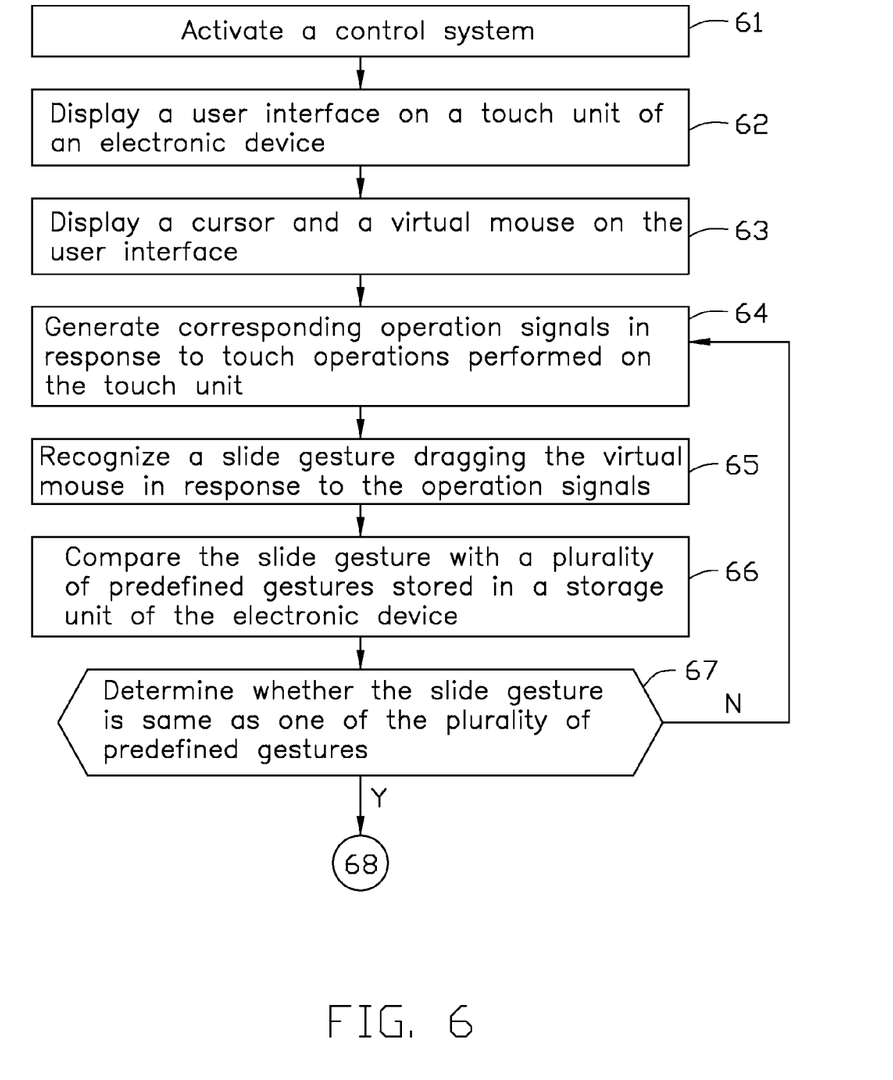
FIGS. 6 and 7 cooperatively constitute a single flowchart of an embodiment of a control method for virtual mouse.
Figure 7:
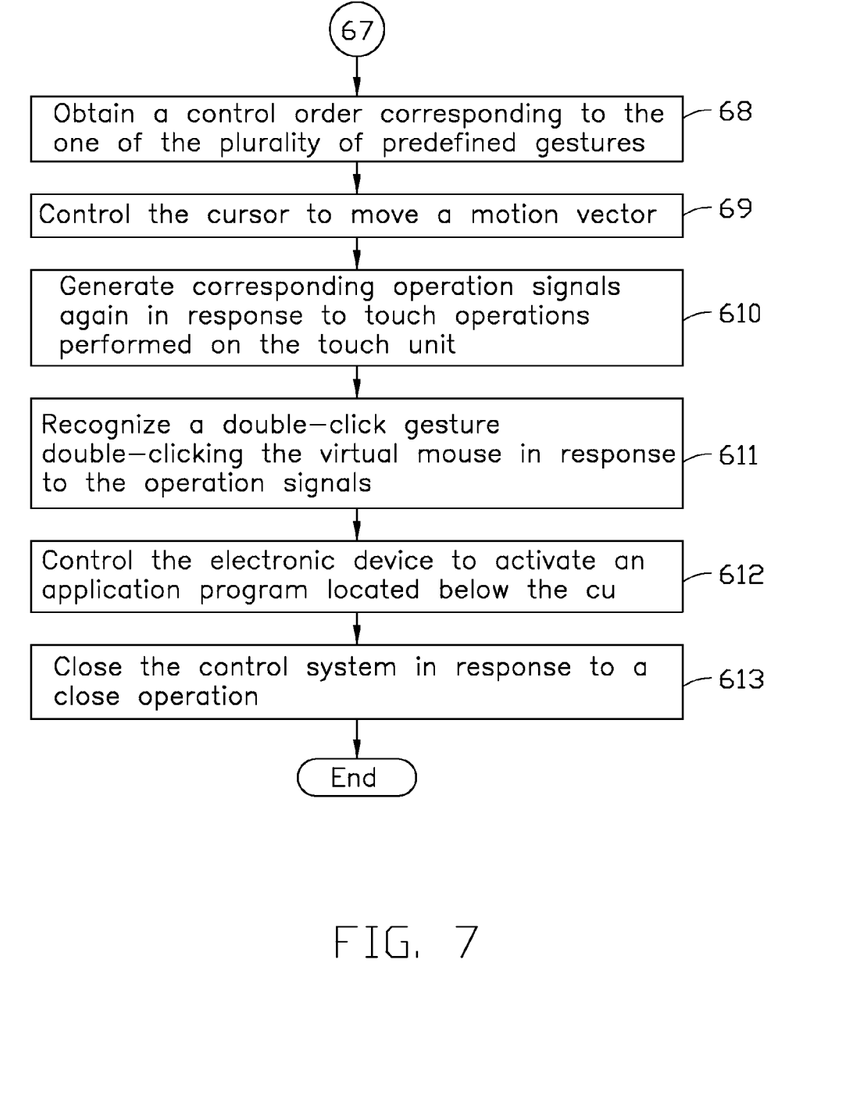

FIGS. 6 and 7 cooperatively constitute a single flowchart of a control method for virtual mouse. The control method for virtual mouse is provided by way of example, as there are a variety of ways to carry out the method. The control method for virtual mouse described below can be carried out using the configurations illustrated in FIG. 2, for example, and various elements of these figures are referenced in explaining the example method. Each block shown in FIGS. 6 and 7 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 61.

At block 61, a user interface is displayed by an electronic device. A storage unit of an electronic device stores an operating system. A processing unit of the electronic device runs the operating system such that the user interface is capable of displaying on a touch unit of the electronic device.

At block 62, a switching module activates a control system in response to an open operation. The control system is an application program installed on the electronic device.

When the electronic device is activated, the switching module activates the application program in response to the open operation performed thereon. The open operation is selected from a group consisting of: double-click a space of the user interface, single-click an activate icon located on a taskbar of the user interface, long press a power button of the electronic device to display a selection bar and further select one corresponding option including in the selection bar, that is, an option of virtual module, double-click a float displayed on the user interface, or other suitable operations.

At block 63, the control system controls a touch unit of the electronic device to display a cursor and a virtual mouse on the user interface of the electronic device.

At block 64, the touch unit generates corresponding operation signals in response to touch operations performed thereon.

At block 65, a gesture recognizing module recognizes a touch gesture in response to the operation signals, and the touch gesture is a slide gesture dragging the virtual mouse using a fingertip.

At block 66, an order obtaining module compares the slide gesture with a plurality of predefined gestures stored in a storage unit of the electronic device.

At block 67, the order obtaining module determines whether the slide gesture is same as one of the plurality of predefined gestures preciously or in an error-allowed range, if yes, the process goes to block 68, otherwise, the process goes to block 64.

At block 68, the order obtaining module obtains a control order corresponding to the one of the plurality of predefined gestures, and the control order is an order for controlling the cursor to move a motion vector.

At block 69, a controlling module controls the cursor to move the motion vector in a relative coordinate system.

At block 610, the touch unit generates corresponding operation signals again in response to touch operations performed thereon.

At block 611, the gesture recognizing module recognizes a double-click gesture double-clicking the virtual mouse in response to the operation signals.

At block 612, the controlling module controls the electronic device to activate an application program located below the cursor or enter into a link of a text or a picture located below the cursor.

At block 613, the switching module closes the control system in response to a close operation. The close operation is but not limited to press a menu button of the electronic device.

Figure 8:
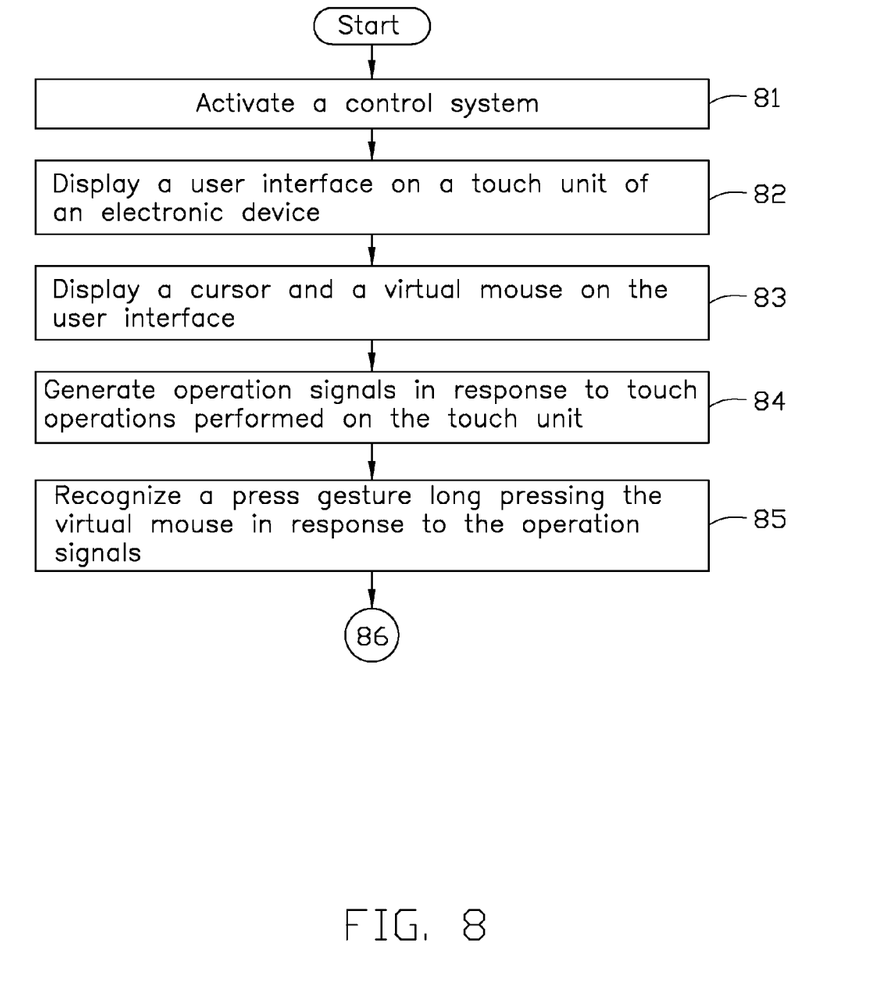
FIGS. 8 and 9 cooperatively constitute a single flowchart of an embodiment of a control method for virtual mouse when an edit state for a user interface of an electronic device as shown in FIG. 1 is entered into.
Figure 9:
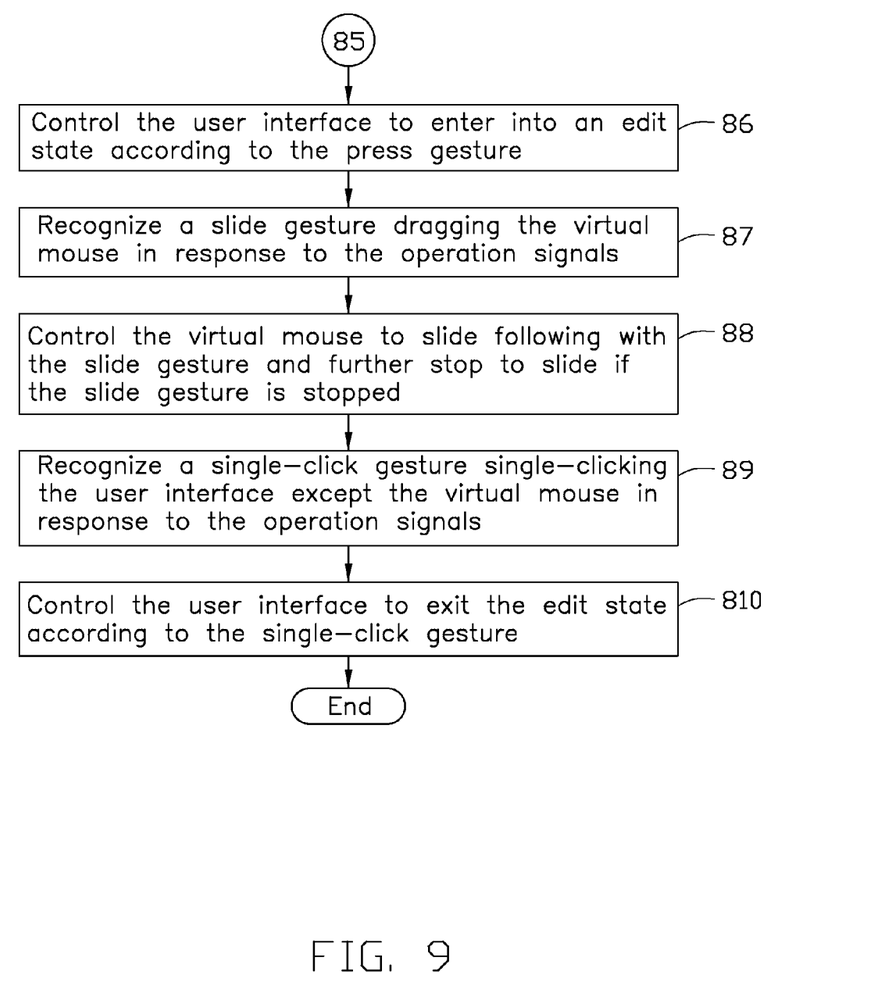

FIGS. 8 and 9 cooperatively constitute another single flowchart of a control method for virtual mouse. The control method for virtual mouse is provided by way of example, as there are a variety of ways to carry out the method. The control method for virtual mouse described below can be carried out using the configurations illustrated in FIG. 2, for example, and various elements of these figures are referenced in explaining the example method. Each block shown in FIGS. 8 and 9 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 81.

At block 81, a user interface is displayed by an electronic device. A storage unit of an electronic device stores an operating system. A processing unit of the electronic device runs the operating system such that the user interface is capable of displaying on a touch unit of the electronic device.

At block 82, a switching module activates a control system in response to an open operation. The control system is an application program installed on the electronic device. When the electronic device is activated, the switching module activates the application program in response to the open operation performed thereon. The open operation is selected from a group consisting of: double-click a space of the user interface, single-click an activate icon located on a taskbar of the user interface, long press a power button of the electronic device to display a selection bar and further select one corresponding option including in the selection bar, that is, an option of virtual module, double-click a float displayed on the user interface, or other suitable operations.

At block 83, the control system controls a touch unit of the electronic device to display a cursor and a virtual mouse on the user interface of the electronic device.

At block 84, the touch unit generates corresponding operation signals in response to touch operations performed thereon.

At block 85, a gesture recognizing module recognizes a touch gesture in response to the operation signals, and the touch gesture is a press gesture long pressing the virtual mouse.

At block 86, a controlling module controls the user interface to enter into an edit state.

At block 87, the gesture recognizing module recognizes a slide gesture dragging the virtual mouse using a fingertip in response to the operation signals.

At block 88, the controlling module controls the virtual mouse to slide following with the slide gesture and further stop to slide if the slide gesture is stopped.

At block 89, the gesture recognizing module recognizes a single-click gesture single-clicking the user interface except the virtual mouse in response to operation signals.

At block 810, the controlling module controls the user interface to exit the edit state.

The embodiments shown and described above are only examples. Many details are often found in the art such as the features of control system for a virtual mouse and control method thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A control system for a virtual mouse, running on an electronic device, the electronic device comprising a touch unit configured for displaying a user interface, the control system comprising:
   at least one processing unit; and
   a non-transitory computer readable medium coupled to the at least one processing unit and configured to store instructions for execution by the at least one processing unit, the instructions causing the at least one processing unit to:
   control the touch unit of the electronic device to display the virtual mouse and a cursor on the user interface in response to an open operation performed thereon, wherein the open operation is selected from a group consisting of: double-clicking a space of the user interface, single-clicking an activating icon located on a taskbar of the user interface, a long pressing of a power button of the electronic device to display a selection bar and further to select one corresponding option included in the selection bar, and double-clicking a float displayed on the user interface;
   recognize a touch gesture in response to one or more operation signals, wherein the one or more operation signals are generated by the touch unit in response to touch operations performed thereon, and the touch gesture comprises a slide gesture dragging the virtual mouse and a click gesture clicking the virtual mouse;
   compare the slide gesture with a plurality of predefined gestures stored in a storage unit of the electronic device;
   determine whether the slide gesture is same as one of the plurality of predefined gestures;
   obtain a control order corresponding to the one of the plurality of predefined gestures when the slide gesture is the same as the one of the plurality of predefined gestures, wherein the control order is an order for controlling the cursor to move a motion vector;
   control the cursor to move the motion vector according to the control order; and
   control the electronic device to activate an application program located below the cursor or enter into a hyperlink in a text or a picture located below the cursor according to the click gesture.

2. The control system for a virtual mouse of claim 1, wherein the click gesture is selected from a group consisting of: a single-click gesture single-clicking the virtual mouse and a double-click gesture double-clicking the virtual mouse.

3. The control system for a virtual mouse of claim 1, wherein the touch gesture further comprises a press gesture long pressing the virtual mouse, the instructions cause the at least one processing unit to:
   control the user interface to enter into an edit state when the press gesture is recognized;
   recognize the slide gesture dragging the virtual mouse; and
   control the virtual mouse to slide following with the slide gesture.

4. The control system for a virtual mouse of claim 3, wherein the instructions cause the at least one processing unit to:
   recognize a click gesture clicking the user interface except the virtual mouse; and
   control the user interface to exit the edit state.

5. The control system for a virtual mouse of claim 4, wherein the click gesture is selected from a group consisting of a single-click gesture single-clicking the user interface except the virtual mouse and a double-click gesture double-clicking the user interface except the virtual mouse.

6. The control system for a virtual mouse of claim 1, wherein the instructions cause the at least one processing unit to:
   close the control system in response to a close operation performed thereon, wherein the close operation is pressing a menu button of the electronic device.

7. A control method for a virtual mouse, running on an electronic device, the electronic device comprising a touch unit configured for displaying a user interface, the control method comprising:
controlling the touch unit of the electronic device to display the virtual mouse and a cursor on the user interface in response to an open operation performed thereon, wherein the open operation is selected from a group consisting of: double-clicking a space of the user interface, single-clicking an activation icon located on a taskbar of the user interface, a long pressing of a power button of the electronic device to display a selection bar and further to select one corresponding option included in the selection bar, and double-clicking a float displayed on the user interface;
recognizing a slide gesture dragging the virtual mouse;
comparing the slide gesture with a plurality of predefined gestures stored in a storage unit of the electronic device;
determining whether the slide gesture is same as one of the plurality of predefined gestures;
obtaining a control order corresponding to the one of the plurality of predefined gestures when the slide gesture is the same as the one of the plurality of predefined gestures, and the control order is an order for controlling the cursor to move a motion vector;
controlling the cursor to move the motion vector according to the control order;
recognizing a click gesture clicking the virtual mouse; and
controlling the electronic device to activate an application program located below the cursor or enter into a hyperlink in a text or a picture located below the cursor according to the click gesture.

8. The control method for a virtual mouse of claim 7, wherein the click gesture is selected from a group consisting of: a single-click gesture single-clicking the virtual mouse and a double-click gesture double-clicking the virtual mouse.

9. The control method for a virtual mouse of claim 7, wherein the touch gesture further comprises a press gesture long pressing the virtual mouse, the control method further comprises:
controlling the user interface to enter into an edit state when the press gesture is recognized;
recognizing the slide gesture dragging the virtual mouse again; and
controlling the virtual mouse to slide following with the slide gesture.

10. The control method for a virtual mouse of claim 9, wherein the control method further comprises:
recognizing a click gesture clicking the user interface except the virtual mouse; and
controlling the user interface to exit the edit state.

11. The control method for a virtual mouse of claim 10, wherein the click gesture is selected from a group consisting of a single-click gesture single-clicking the user interface except the virtual mouse and a double-click gesture double-clicking the user interface except the virtual mouse.

12. A non-transitory storage medium having stored thereon instructions that, when executed by at least one processing unit of an electronic device, cause the least one processing unit to execute instructions of a control method for a virtual device, the electronic device comprising a touch unit configured for displaying a user interface, the control method comprising:
controlling the touch unit of the electronic device to display the virtual mouse and a cursor on the user interface in response to an open operation performed thereon, wherein the open operation is selected from a group consisting of: double-clicking a space of the user interface, single-clicking an activation icon located on a taskbar of the user interface, a long pressing of a power button of the electronic device to display a selection bar and further to select one corresponding option included in the selection bar, and double-clicking a float displayed on the user interface;
recognizing a slide gesture dragging the virtual mouse;
comparing the slide gesture with a plurality of predefined gestures stored in a storage unit of the electronic device;
determining whether the slide gesture is same as one of the plurality of predefined gestures;
obtaining a control order corresponding to the one of the plurality of predefined gestures when the slide gesture is the same as the one of the plurality of predefined gestures, and the control order is an order for controlling the cursor to move a motion vector;
controlling the cursor to move the motion vector according to the control order;
recognizing a click gesture clicking the virtual mouse; and
controlling the electronic device to activate an application program located below the cursor or enter into a hyperlink in a text or a picture located below the cursor according to the click gesture.

13. The non-transitory storage medium of claim 12, wherein the click gesture is selected from a group consisting of: a single-click gesture single-clicking the virtual mouse and a double-click gesture double-clicking the virtual mouse.

14. The non-transitory storage medium of claim 12, wherein the touch gesture further comprises a press gesture long pressing the virtual mouse, the control method further comprises:
controlling the user interface to enter into an edit state when the press gesture is recognized;
recognizing the slide gesture dragging the virtual mouse again; and
controlling the virtual mouse to slide following with the slide gesture.

15. The non-transitory storage medium of claim 14, wherein the control method further comprises:
recognizing a click gesture clicking the user interface except the virtual mouse; and
controlling the user interface to exit the edit state.

16. The non-transitory storage medium of claim 15, wherein the click gesture is selected from a group consisting of: a single-click gesture single-clicking the user interface except the virtual mouse and a double-click gesture double-clicking the user interface except the virtual mouse.

* * * * *